United States Patent [19]
Virkar et al.

[11] Patent Number: 4,895,776
[45] Date of Patent: Jan. 23, 1990

[54] ELECTROCHEMICAL CELL UTILIZING SELENIUM AS AN ELECTRODE-REACTANT

[75] Inventors: Anil V. Virkar, Salt Lake City, Utah; Gerald R. Miller, East Amherst, N.Y.; James R. Rasmussen, Salt Lake City, Utah

[73] Assignee: Ceramatec, Inc., Salt Lake City, Utah

[21] Appl. No.: 267,690

[22] Filed: Oct. 26, 1988

Related U.S. Application Data

[63] Continuation of Ser. No. 25,109, Mar. 12, 1987, abandoned.

[51] Int. Cl.$^4$ .............................................. H01M 4/36
[52] U.S. Cl. ..................................... 429/102; 429/104
[58] Field of Search ................................ 429/102, 104

[56] References Cited

U.S. PATENT DOCUMENTS

| | | | |
|---|---|---|---|
| 3,476,602 | 11/1969 | Brown et al. | 429/104 |
| 3,672,995 | 6/1972 | Brown et al. | 429/104 |
| 3,679,480 | 7/1972 | Brown et al. | 429/104 |
| 4,015,054 | 3/1977 | Cleaver et al. | 429/104 |
| 4,287,269 | 9/1981 | Coetzer et al. | 429/103 |

Primary Examiner—Stephen J. Kalafut
Attorney, Agent, or Firm—Trask, Britt & Rossa

[57] ABSTRACT

An improved high temperature electrochemical cell employing a molten alkali metal anolyte, a solid ceramic electrolyte containing mobile alkali metal ions, and a molten sulfur/selenium catholyte is disclosed.

7 Claims, 12 Drawing Sheets

DIAGRAM OF SECOND GENERATION EMF CELLS

Fig. 1
VAPOR PRESSURE OVER MIXTURES
OF SULFUR AND SELENIUM

Fig. 2

DIAGRAM OF FIRST GENERATION EMF CELLS

Fig. 3
DIAGRAM OF SECOND GENERATION EMF CELLS

Fig. 8
OPEN CIRCUIT VOLTAGE VS. SODIUM CONTENT
FOR 50% Se 50% S CATHODE

Fig. 9
OPEN CIRCUIT VOLTAGE VS. SODIUM CONTENT
FOR 100% S CATHODE

Fig. 10
DIAGRAM 21 AHR CELL

Fig. 11  CELL CAPACITY VS. CYCLE NUMBER

Fig. 12
CELL RESISTANCE VS. CYCLE NUMBER

ELECTROCHEMICAL CELL UTILIZING SELENIUM AS AN ELECTRODE-REACTANT

BACKGROUND OF THE INVENTION

1. Field

This invention relates to high temperature electrochemical cells employing liquid alkali metal anolytes and liquid chalcogen catholyte, and parcticularly to an electrochemical cell such as a secondary battery employing molten alkali metal, especially sodium, as an anolyte and a mixture of molten selenium as a catholyte.

2. Prior Art

Various types of electrochemical cells employing molten alkali metal electrode-reactants (anolytes) are known. These cells generally employ as an impervious electrolyte an ionically conductive ceramic, for example, beta"-alumina, or glass membranes through which alkali metal ions pass. Secondary batteries employing a molten sodium anolyte and a molten sulfur catholyte are described in U.S. Pat. Nos. 3,404,035 and 3,404,036 to Kummer, et al. A primary battery having a molten sodium reactant in contact with a sodium ion conductive ceramic membrane is described in U.S. Pat. No. 3,458,356 to Kummer, et al.

Selenium has been mentioned in various patents, for example, U.S. Pat. Nos. 3,476,602; 3,672,995 and 3,679,480 to Brown, et al. and U.S. Pat. No. 4,105,054 to Clever, et al., as a catholyte material. In Fischer, U.S. Pat. No. 4,127,705, selenium is described as an additive to the catholyte in minor quantities. The mention of selenium has generally been in reference with other catholytes in which sulfur is the preferred cathodic material and selenium, tellurium, tetracyanoethylene, para-thiocyanogen, ferricyanide, and the like are optional cathodic materials. As indicated in the Clever, et al. patent, a fused salt is interposed betwen the anodic material and the electrolyte. All experimentation referenced in the prior art patents known to applicant is related to sulfur as the cathodic material.

Substantially pure selenium has been employed as a catholyte by the instant inventors. Although certain advantages appear from the use of selenium as a catholyte, certain problems, such as high viscosity of the selenium-selenide mixture have become apparent. Also, some difficulties in wetting of solid components within the selenium has been suspected.

A great deal of work has been done on the sodium-sulfur battery. It has shown great potential as a power source for electric vehicles because of its power to weight ratio, which is about ten times better than conventional lead-acid batteries. The sodium-sulfur battery also has the potential of long life when operated within the proper parameters. These proper parameters may, however, be a hindrance to widespread commercialization of the sodium-sulfur battery.

The sodium-sulfur battery, based upon present performance, is projected to give a compact size vehicle a range of about 200 miles, moderate acceleration, and a recharge time of about eight hours. Such a vehicle would be a suitable urban vehicle. However, improvement of the range, acceleration and recharge rate would enhance considerably the usefulness of electric vehicles. The operating parameters of the sodium-sulfur battery remain an obstacle to such improvements.

The range of an electric vehicle is limited by the capacity of the battery powering it. The capacity is a function of degree of discharge. The sodium-sulfur battery can be discharged until the sulfur is converted to $Na_2S_3$ (at 350° C.). If it is discharged further, certain sulfides of sodium, normally $An_2S_2$, are precipitated which become and remain insoluble even upon recharge. Repeated "deep-discharge" of a sodium-sulfur battery will ultimately render the battery useless.

The projected recharge rate for a sodium-sulfur battery; i.e., overnight recharging, is acceptable for an urban car with a range of 200 miles. However, it would be desirable for long distance travel to have a vehicle with a range of 300 to 400 miles, or more, with a recharging rate of one hours, which would permit recharging during meal breaks. Rapid recharging is limited by the critical current density which the solid electrolyte will tolerate. Electrolyte tubes of beta"-alumina, a particularly effective sodium ion conductor, have excellent life so long as recharging of a cell containing such electrolytes is done at a current density less than the critical current density. Critical current density increases for beta"-alumina electrolytes as temperature increases. Similarly, conductivity (the inverse of resistance) increases for such electrolytes with increasing temperature. Increasing the operating temperature of a sodium-sulfur cell above the usual temperature of 350° C. is detrimental in other respects. Sulfur presents a troublesome corrosion problem at 350° C.; at higher temperatures, the corrosion problem is greatly exacerbated. Sulfur-containing cells may become pressurized at more elevated temperatures. For a number of reasons, a pressurized cell is generally undesirable.

A further problem associated with sodium-sulfur batteries, particularly for some applications, has been the excessive weight required for a thermal management system. Since the temperature of a sodium-sulfur cell must generally be controlled at less than about 300° C., and preferably below 350° C., rapid discharge or recharging can create a great deal of heat energy which must be dissipated rapidly to maintain cell temperatures below 350° C. The weight of the thermal management system for a conventional sodium-sulfur battery has been estimated to be at least as much as 25% of the total battery (cell plus heat exchangers, etc.).

OBJECTS OF THE INVENTION

It is an object of the instant invention to provide a less corrosive electrochemical cell which may be deep-discharged.

It is a further objective to provide an electrochemical cell utilizing a molten anolyte and catholyte for operation at very high temperatures, for example, temperatures in excess of 500° C.

Another object of the invention is to provide an electrochemical cell having a catholyte material which enhances the conductivity of the electrolyte and whose reaction with anolyte ions produces an electronically conductive material.

SUMMARY OF THE INVENTION

An improved, high-temperature, substantially adiabatic electrochemical cell has been invented. The cell comprises a liquid anolyte containing an alkali metal, a solid electrolyte possessing mobile alkali metal ions of the same alkali metal as is present in the anolyte, and a liquid catholyte containing sulfur and selenium as a major component.

The anolyte is preferably a very pure, molten alkali metal, especially sodium.

The electrolyte is a solid, impervious membrane such as ceramic beta- or beta''-alumina in which mobile alkali metal ions, especially sodium ions, are present. Certain glass electrolytes may also be used, but are generally less desirable because the mobile alkali metal ions transport at a slower rate than the alkali metal ions of beta- or beta''-aluminas and because of the high temperatures encountered in the alkali metal-sulfur/selenium cells.

The catholyte is preferably a molten mixture of sulfur and selenium in which the selenium is present in a molar ratio of from about 3:1 to about 30:1 selenium to sulfur, and especially in a ratio of from about 4:1 to about 20:1, and particularly at about 10:1.

BRIEF DESCRIPTION OF THE DRAWINGS

FIG. 4 is a graph showing open circuit voltage vs. sodium content for 70% Se 30% S cathode;

FIG. 8 is a graph showing open circuit voltage vs. sodium content for 100% S cathode;

DETAILED DESCRIPTION OF THE EMBODIMENTS

An improved electrochemical cell employing a molten alkali metal anolyte and a molten sulfur/selenium catholyte has been invented. The improved cell employs a solid, impervious cation-conducting membrane; i.e., electrolyte, of beta-alumina or beta''-alumina. The alkali metal anolyte, particularly sodium, may contain minor quantities of selenium or minor quantities of selenium may be contained within the electrolyte, as described in U.S. Pat. No. 4,407,912 of Virkar and Miller, incorporated herein by reference.

It has been found that a sodium-sulfur/selenium electrochemical cell may be operated efficiently without many of the disadvantages which accompany sodium-sulfur electrochemical cells. The sodium-sulfur/selenium cell, because of the lower corrosiveness of the selenium and its lower vapor pressure, may be operated at much higher temperatures. For example, normal operation of a sodium-sulfur cell is about 350° C. with a practical upper limit of a sodium-sulfur cell of about 400° C. (sulfur boils at 444° C.), while sodium-sulfur/selenium cells may be operated effectively at temperatures up to about 550° C., and greater, without becoming unduly pressurized.

Pressurization of cells containing molten materials is undesirable because of the possibility of an explosive-type failure of the cell. Constructing a cell to withstand pressure involves the use of thicker-walled materials. A thick-walled ceramic electrolyte such as beta''-alumina is undesirable inasmuch as resistance of the electrolyte increases proportionately with cell wall thickness.

Sodium-sulfur/selenium cells can be operated essentially adiabatically over a wide range of charge and/or discharge rates because of the high temperatures permissible in such cells because of the minimal pressures generated. If a heat exchanger system is required to maintain lower cell temperatures, it can be a simpler, lighter system than is required for a comparable sodium-sulfur cell.

Electrochemical cells of the sodium-sulfur and the sodium-sulfur/selenium type have increased efficiency with increased temperatures; however, because of some of the problems; e.g., excessive corrosion and pressurization, attendant at elevated temperatures with sodium-sulfur cells, such cells are operated at relatively low temperatures; i.e., generally at 350° C. and lower. Also, degradation of the electrolyte has been of concern in sodium-sulfur cells while the operation of the sodium/selenium cell has been found to involve less electrolyte degradation. Selenium, either in small quantities in the anodic material or in the electrolyte, as disclosed in copending U.S. Ser. No. 310,859, or present as substantially the sole constituent of the cathode, diminishes the problems of degradation of the electrolyte. The inclusion of selenium as a major constituent of the catholyte appears to impart a beneficial effect to the beta-alumina or beta''-alumina electrolyte.

Small quantities of various ingredients may be added to the mixed sulfur-selenium catholyte for purposes of assisting in control or adjustment of viscosity or to enhance further the conductivity of the catholyte. Gallium or thallium may be advantageously utilized to lower the viscosity of the molten mixture.

Certain advantages of a two-phase system are generally apparent. For example, in the sodium-sulfur battery, the catholyte, upon discharge, contains both sodium and sulfur, as ions, and usually elemental sulfur. The sodium and sulfur ions may form various compounds, some of which may be solid at the temperature of the catholyte, which can be very disadvantageous. However, a two-phase system of sodium and sulfur would generally be anticipated to be much less complex than a three-phase system such as sodium-sulfur/selenium wherein ions of sodium, sulfur and selenium may be present as a variety of solid and/or liquid sulfides, selenides or sulfide-selenides. Elemental sulfur and selenium, which may form polymers, are also potentially present in the catholyte chamber. Even in liquid form, the sulfides, selenides or sulfide-selenides may be immiscible with one another or immiscible with either elemental sulfur or selenium.

The unique cells of this invention can be operated over a wide range of temperatures, for example, from about 350° C. to about 550° C., without undue internal pressure occurring. For example, at a molar ratio of 3 ⓒ 1 selenium to sulfur, a pressure of 410 Torr (normal accepted operating temperature for sodium-sulfur cells) is not realized until a temperature in excess of about 550° C. is achieved. Similarly, a cell containing selenium in a 20:1 molar ratio to sulfur may be operated close to 600° C. without an internal pressure of more than 410 Torr occurring.

Since joule energy losses decrease with increasing temperature, a two-fold effect is achieved by higher cell operating temperatures:

1. More energy is recovered as electricity (less heat generated); and

2. The higher permissible operating temperature permits the heat capacity of the cell to absorb most, if not all, of the heat generated by the cell.

Consequently, in many instances, mixed sulfur-selenium catholyte cells would require no external heat exchange system, especially if the rate of charge or discharge were controlled. Even under circumstances where the cells were permitted to discharge or recharge as rapidly as possible, minimal heat exchange systems would be required.

Figure 1:
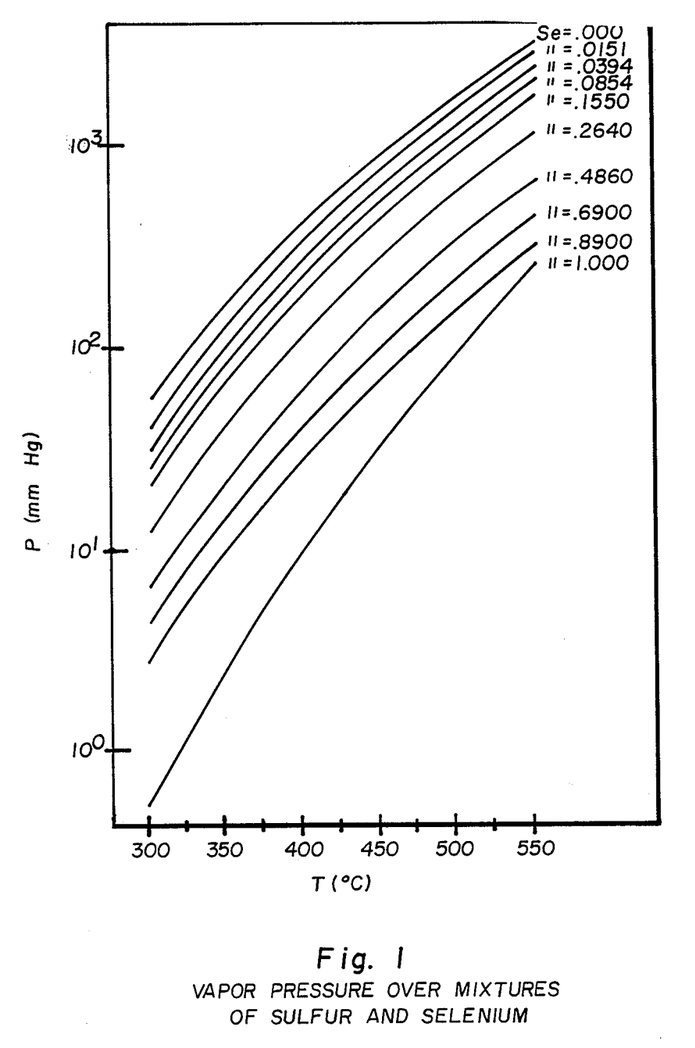
FIG. 1 is a graph showing vapor pressure over mixtures of sulfur and selenium.

Improvements available from sulfur/selenium mixed cathode system over the pure sulfur cathode system are a result of higher allowable operating temperatures. By adding selenium to sulfur, the total vapor pressure at a given temperature is reduced. A plot of total vapor pressure as a function of temperature and composition is shown in FIG. 1. The generally acceptable upper operating temperature limit for the sodium-sulfur battery is about 400° C., for which the vapor pressure over pure sulfur is 410 mm Hg. In a mixed sulfur-selenium cathode system with a selenium mole fraction of 0.7 operating at a temperature of 550° C., the vapor pressure remains at or below 410 mm Hg. Decreasing the selenium content to 0.5 reduces the temperature limit to about 525° C. for a total vapor pressure of 410 mm Hg.

The advantages of increasing the battery operating temperature include:

1. Improved resistance of the beta"-alumina electrolyte to electromechanical degradation, thereby allowing higher current densities and potentially contributing to increased electrolyte lifetimes.

2. Increased ionic conductivity of the beta"-alumina electrolyte and the sodium polychalcogenide cathode melt resulting in increased energy storage efficiencies.

3. Increased cell capacity resulting from greater depth of discharge.

While higher operating temperatures are possible with a mixed cathode system, it is not necessarily a requirement that a high battery temperature be maintained throughout the charge/discharge cycle. In fact, for batteries used in space satellite missions in which charge/discharge cycles are highly asymmetric (short, high current discharge followed by a substantially longer, lower current recharge), the weight of the thermal management system could be substantially reduced if a substantial temperature rise could be tolerated during battery discharge. For example, in a six hour polar orbit cycle in which an approximately 30 minute discharge may be followed by a five and a half hour recharge period, the thermal management system could be sized such that during discharge the battery temperature rises from 350° C. to say 525° C. and then during the long recharge portion of the cycle, the battery temperature is gradually reduced to the initial 350° C. level.

Furthermore, due to the decreased resistance of the beta"-alumina electrolyte and the sodium polychalcogenides at higher temperatures, joule losses during charge and discharge are reduced, further reducing the cooling requirements. Additional cell capacity is also expected in the mixed sulfur-selenium cathode battery system if there exist eutectics or substantial depressions in the melting points of some of the higher melting sodium polysulfide and sodium polyselenide compounds.

EXAMPLE I

To fully assess the feasibility of a sulfur-selenium cathode, and to choose optimum compositions, some knowledge of the sodium-sulfur/selenium phase diagram is required. The preliminary literature review prior to submission of the Phase I proposal showed little in the way of really relevant data. During a subsequent and far more extensive review, a single article was located which is applicable. N. M. Romanchenko, E. A. Mairova, and A. G. Morachevskii, "Investigation of Melts in the Sodium-Sulfur-Selenium System by Electromotive-Force Measurements," Electrokhimiya, 18, pp. 225–227 (1982). This work by Russian investigators shows that the liquid immiscibility present in the sodium-sulfur system extends all the way to the sodium/selenium system. The previously known sodium/selenium phase diagrams did not show this feature. In addition, the Russian work tends to indicate that there is some depression of the melting point of $Na_2S_2$ and $Na_2Se_2$; however, the data in this portion of the diagram were not extensive.

In order to fully evaluate the feasibility of the mixed cathode system, additional phase diagram information is desirable. To obtain this information, four cells, shown schematically in FIG. 2, were fabricated. Each cell consisted of an alpha-alumina tube whose internal diameter was ground to form a ledge upon which a beta"-alumina disc was seated and sealed with a glass. The smaller compartment of the cell was the cathode compartment, and the longer chamber the anode department. Aluminum gaskets were used to seal the alpha-alumina tube to the 316 stainless steel cell ends. In the cathode compartment, a thin layer of graphite powder was laid down on the beta"-alumina disc. Appropriate amounts of sulfur and selenium were placed over this layer. A graphite felt disc (Union Carbide WDF graphite felt) with a porosity of abut 95% was placed on the top of the cathodic reactants. A molybdenum foil disc was used as the cathode current collector. Sealing on this end was again accomplished by means of an aluminum gasket between the alpha-alumina tube and the molybdenum foil.

Figure 2:
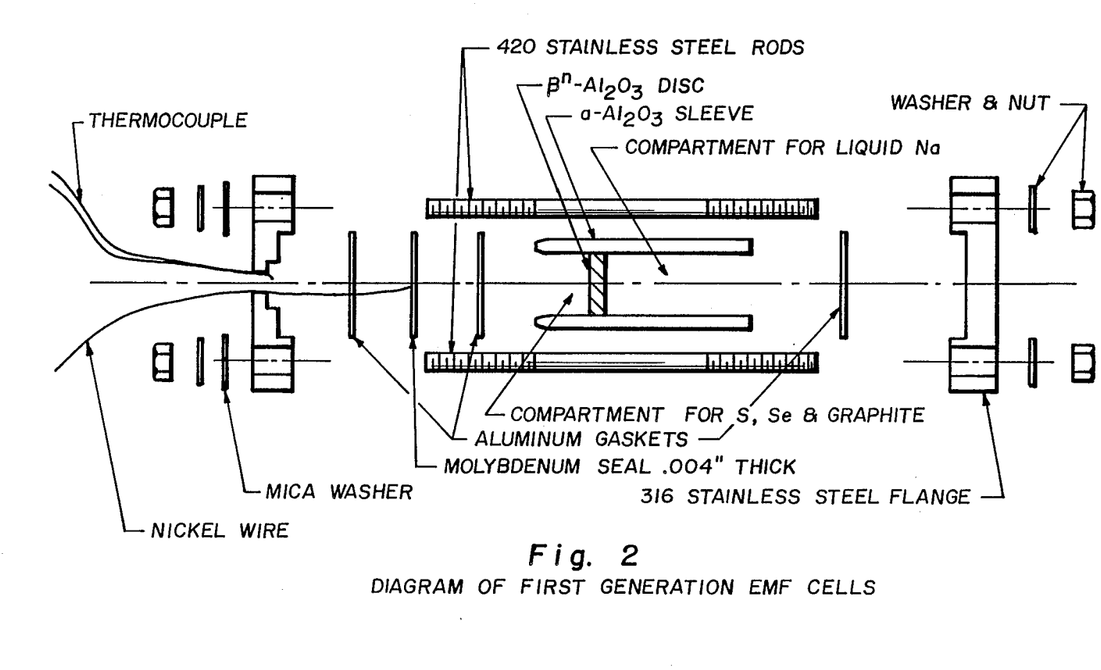
FIG. 2 is a diagram of first generation EMF cells.

The initial cathode compositions of the four cells were 0.6, 0.7, 0.8, 0.9 (mole fractions) selenium, respectively. The cells were heated to nominally 500° C. Two of the cells (those with selenium compositions of 0.8 and 0.9, respectively) developed leaks in the aluminum gaskets on the anode end of the cells allowing the sodium to leak out of the cells. Further testing of these two cells was terminated. The remaining two cells were discharged at low currents. At periodic intervals, the cells were allowed to stand in an open-circuit condition for a period of time sufficient to obtain stable open-circuit voltage measurements. After equilibration at high temperatures, the open-circuit voltages of the cells were measured as functions of temperature from 300° C. to 500° C.

During the course of these experiments, very large polarizations developed, causing discharge to be extremely slow. Further, after short periods of discharge, up to ten days were required to reach equilibrium as indicated by the attainment of a time independent open-circuit cell voltage. In addition, the slow cathode kinetics resulted in very low currents which could not be maintained at a level which was constant enough to enable accurate calculation of the state of discharge. However, there was an indication that the open-circuit voltage at early stages of discharge from fully charged states can have a positive temperature coefficient. These cell tests were eventually abandoned.

After cooling and dismantling the cells, several problems were found. It was found that the sulfur and selenium were not wetting the graphite felt and soaking into the felt as does pure sulfur. Hence, little of the cathodic reactants may have been present at the graphite/beta"-alumina interface where they could react with the sodium ions coming through the beta"-alumina electrolyte. In addition, the high viscosity of the mixture may have further slowed the cathode reaction kinetics.

During the post-test cell examination, it was also observed that the beta"-alumina to alpha-alumina glass seals were somewhat degraded. Both seals were tested for helium leak tightness and both were found to have gross leaks. Thus, the cells could possibly have been partially shorted internally for portions of the time they were on test. A positive result was that the beta"-alumina electrolyte was not degraded.

EXAMPLE II

After the first series of cell tests set forth in Example I were conducted, a different cell design was adopted with features intended to alleviate most of the problems with the previous cells. In order to avoid the seal problems, the second cell was designed such that all of the seals were well above the cell reactants and could be maintained at a lower temperature. The cell shown schematically in FIG. 3 consisted of a beta"-alumina tube partially filled with graphite felt (Union Carbide WDF) impregnated with the desired mixture of sulfur and selenium. Electrical contact to the graphite was made by means of a molybdenum wire.

Figure 3:
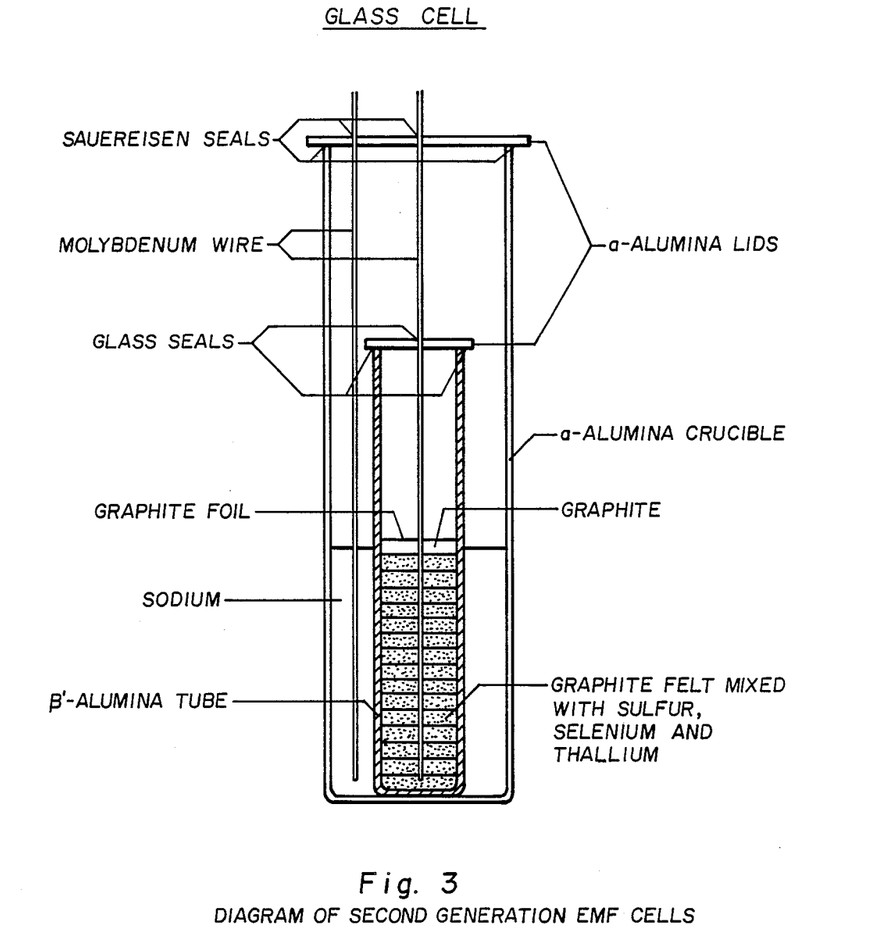
FIG. 3 is a diagram of second generation EMF cells.
Figure 4:
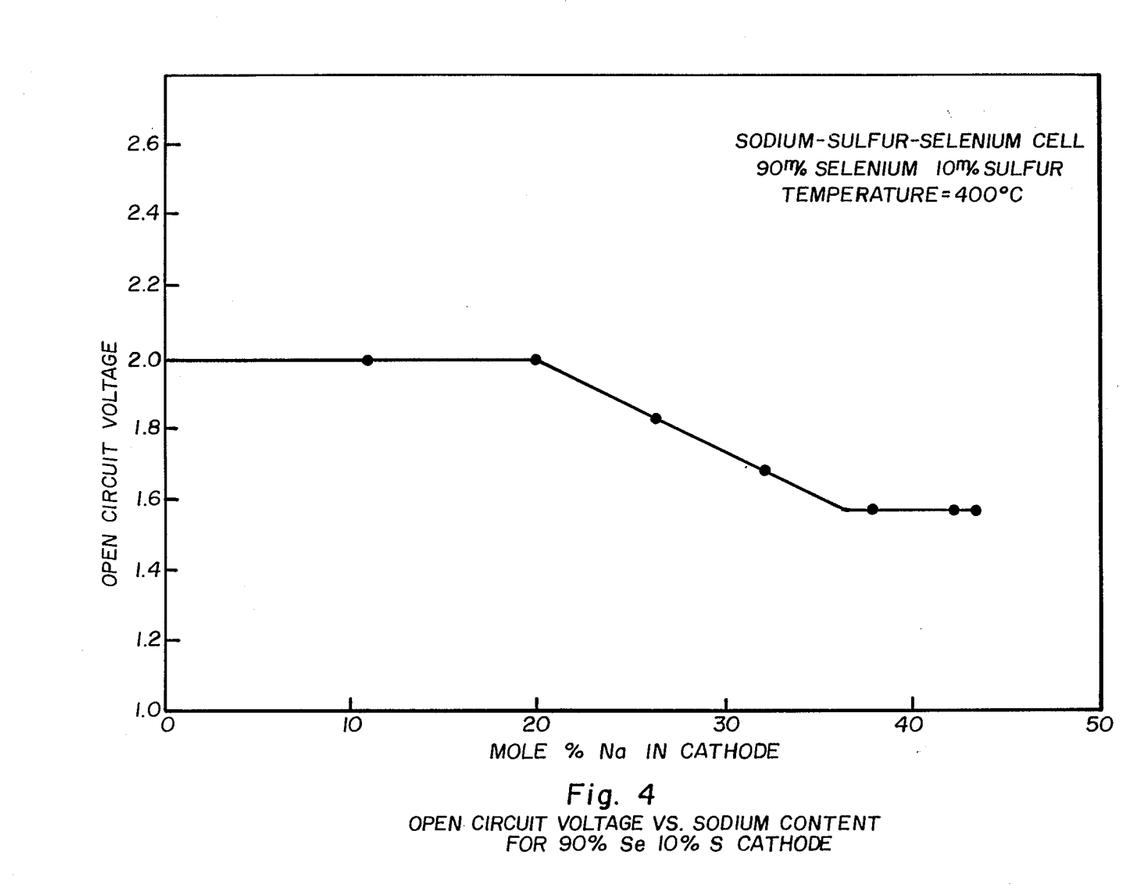
FIG. 4 a graph showing open circuit voltage vs. sodium content for 90% Se 10% S cathode.
Figure 5:
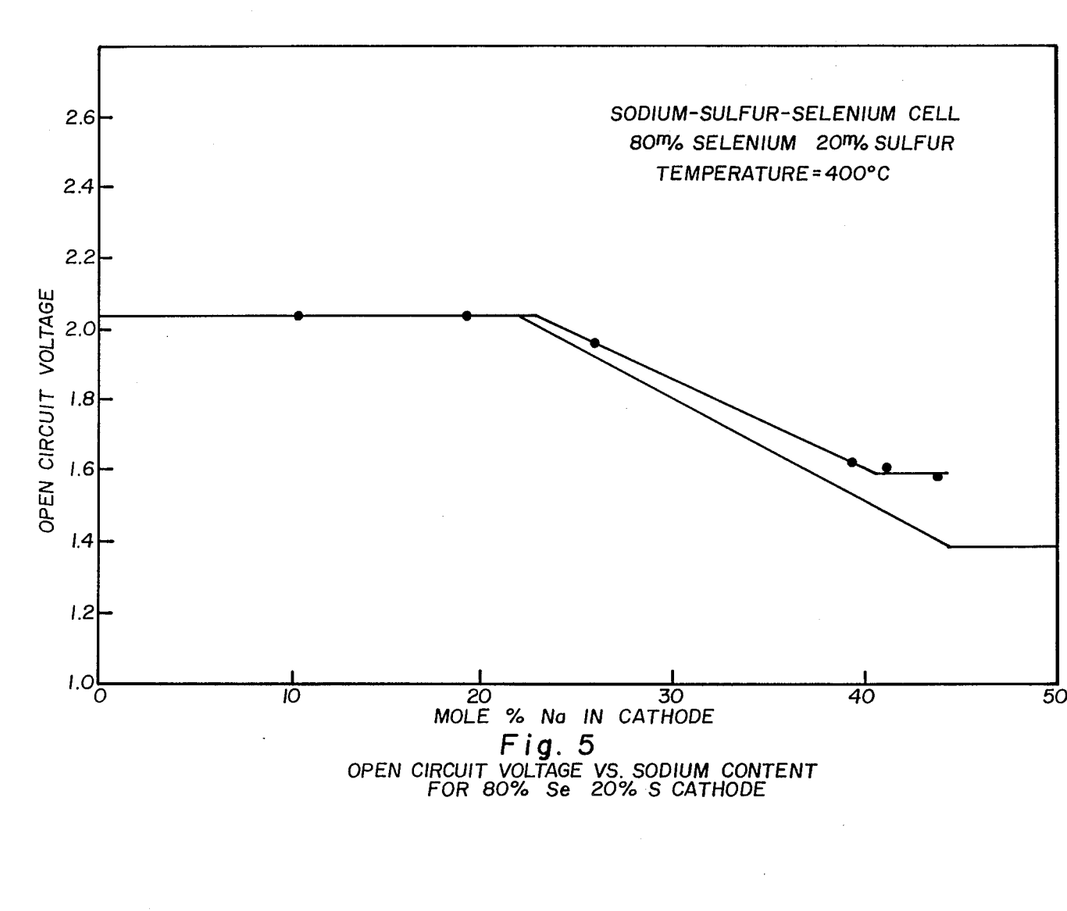
FIG. 5 is a graph showing open circuit voltage vs. sodium content for 80% Se 20% S cathode.
Figure 6:
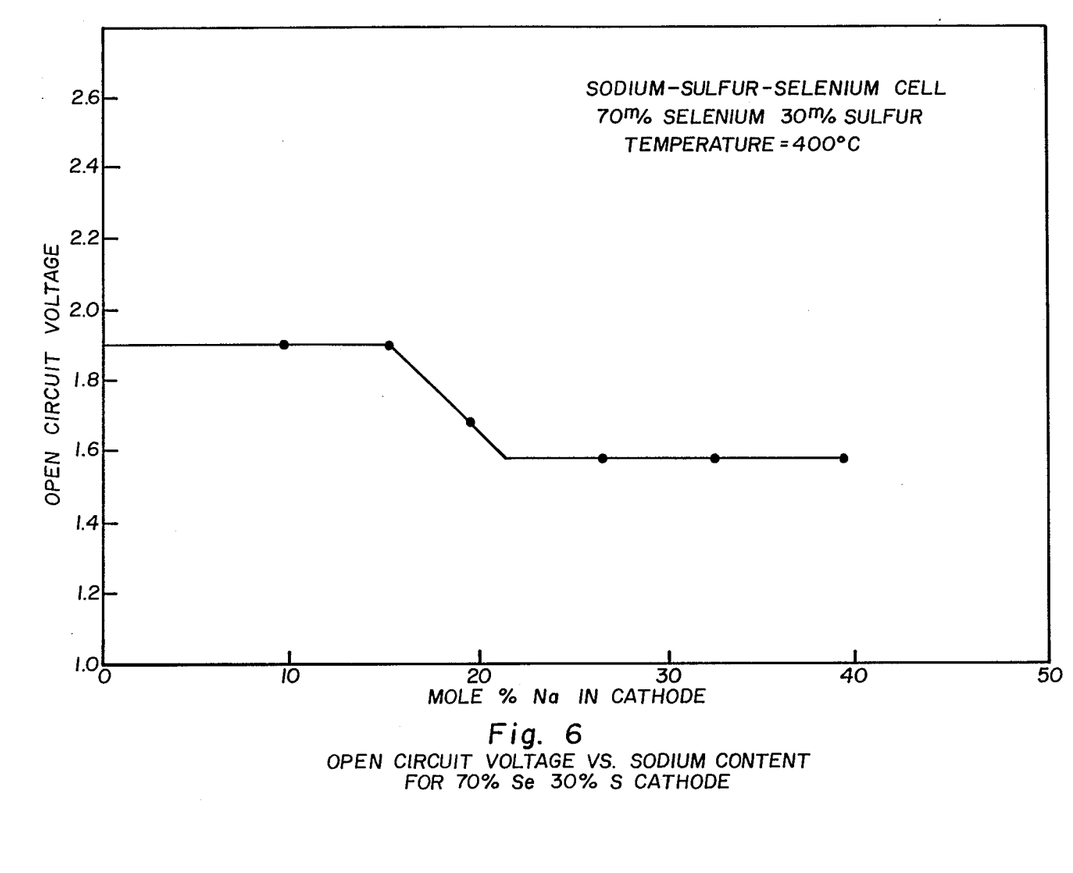
FIG. 6 is a graph showing open circuit voltage vs. sodium content for 60% se 40% S cathode.
Figure 7:
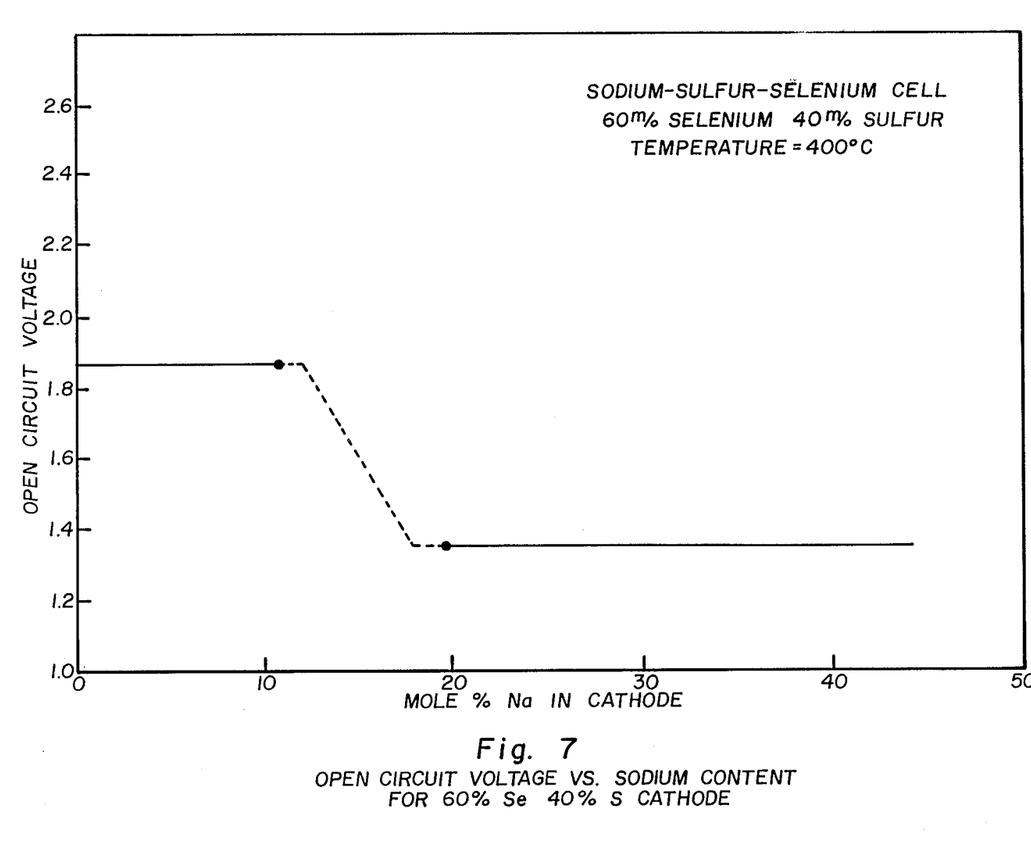

The top of the beta"-alumina tube was closed by an alpha-alumina plate sealed to the top of the tube with a sealing glass. The molybdenum wire was sealed (with the same sealing glass) into a hole drilled through the plate. The electrolyte/cathode assembly was then placed into a beta"-alumina alpha-alumina crucible containing sodium. Contact to the sodium was also made by way of a molybdenum wire. The top of this crucible was closed by an alpha-alumina plate with holes in it for the molybdenum wires. This lid was sealed to the crucible with Sauereisen No. 8 Cement as were the molybdenum wires passing through the lid. This entire assembly was then placed into a quartz and Vycor container which could be evacuated to prevent oxygen from diffusing through the cement seals and oxidizing the sodium.

Four cells were used with respective initial cathode compositions of 90, 80, 70, and 60 mole percent selenium. In addition, 1.5% thallium was added to the catholyte mixtures for viscosity control which was expected to help reach equilibrium somewhat more rapidly. Following the assembly, the cells were placed in furnaces and heated to about 500° C. The treatment of the cells and the taking of data followed the same procedure used for the first set of cells.

A summary of the data obtained from these cells is shown in Table I. The voltage/temperature data for each composition were fitted to an equation (or pair of equations) of the form $V=a+b\times T$. In several cases, the best fit was obtained by a pair of equations. This is to be expected when the catholyte undergoes a phase change. For example, in the catholyte containing 80 mole percent selenium, the breaks in the curves appear to correspond to the formation of solid compounds. In some cases, however, there are breaks in the curve where none were expected and may be due to some sort of ordering occurring in the liquid state.

Figure 8:
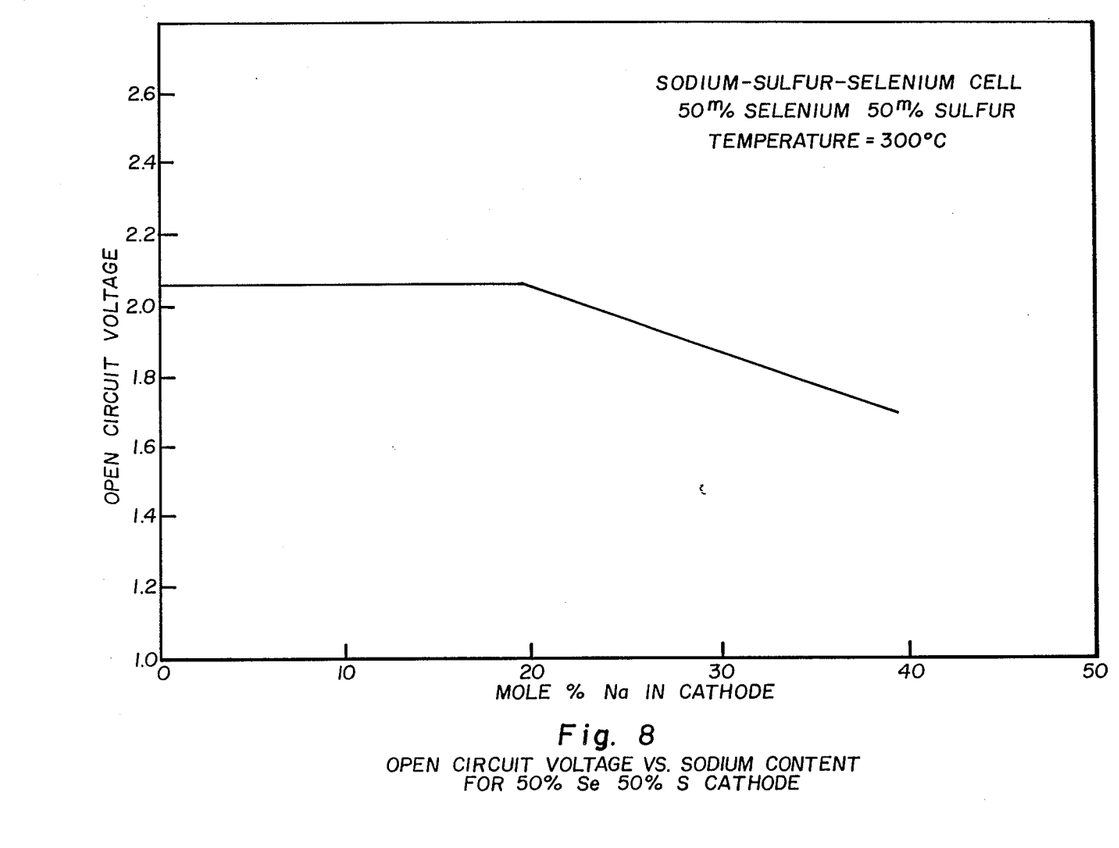
FIG. 8 is a graph showing open circuit voltage vs. sodium content for 50% Se 50% S cathode.
Figure 9:
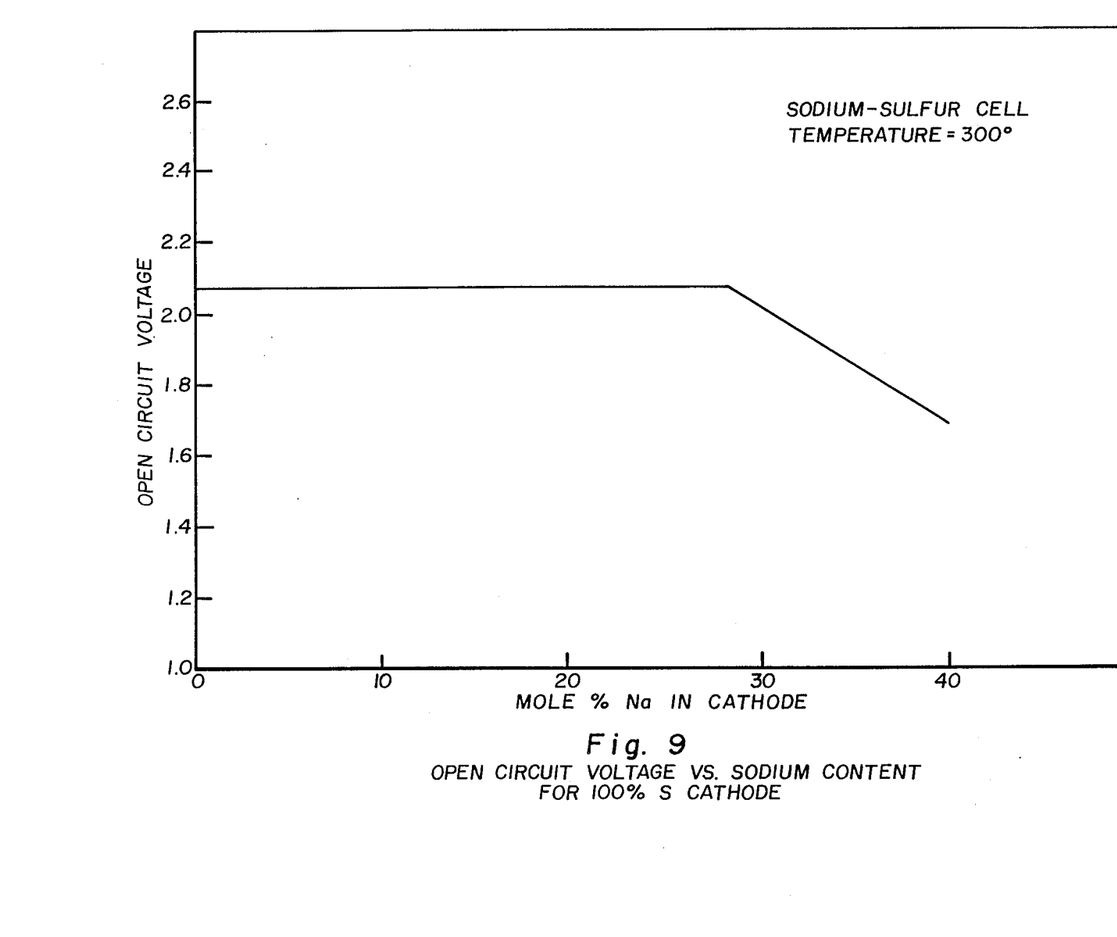

The open-circuit voltages are plotted as functions of mole percentage of sodium in the catholyte at constant temperature (400° C.) for the four starting compositions in FIGS. 4, 5, 6 and 7. On the basis of these data, a cell with a catholyte containing 80 mole percent selenium and 20 mole percent sulfur has the greatest capacity. Comparison with similar data for a cell with a cathode containing 50 mole percent selenium and 50 mole percent sulfur and for a cell with a 100 percent sulfur cathode (shown in FIGS. 8 and 9, respectively) indicates that a cell with a catholyte containing 80 mole percent selenium will have about 1 percent greater specific capacity than one with a pure sulfur cathode and about 1.25 percent greater capacity than the 50 mole percent selenium cathode cell. On the basis of the data shown in Table I, a cell with a catholyte containing 80 mole percent selenium can be discharged to approximately 45 mole percent sodium at 550° C. before problems with the formation of solid compounds occurs. This amounts to a 12 percent increase in specific capacity over a pure sulfur cathode cell.

After the measurements were completed, the cells were dismantled and the components carefully examined. All components, with the exception of the molybdenum wire in contact with the catholyte, showed no evidence of corrosion or degradation. The molybdenum wires were somewhat corroded by the catholyte. Molybdenum has shown some promise for being used as the current collector in a sodium/beta"-alumina/sulfur battery (6); however, the higher temperatures encountered in the mixed sulfur-selenium cathode may result in levels of corrosion which are intolerable for long term cell operation.

25 AMPERE-HOUR CELL DEVELOPMENT

Design and Assembly

Figure 10:
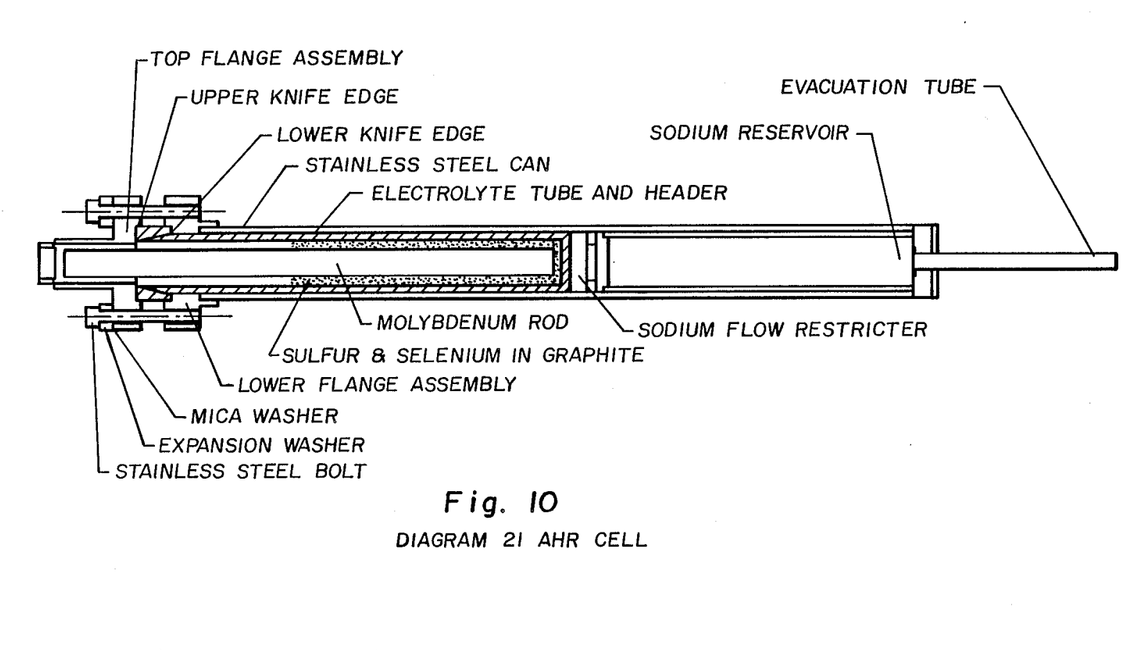
FIG. 10 is a diagram of 21 Ahr cell.

On the basis of the data, a catholyte composition of 80 mole percent selenium and 20 mole percent sulfur was chosen for evaluation in actual cells. To evaluate the performance of the mixed chalcogenide cathode cell under cyclic charge/discharge conditions, two cells nominally of 25 Ahr capacity were designed, fabricated and tested. The design of the cells is shown in FIG. 10.

The cells were of central cathode design with the cell containers made from 410 stainless steel. The cathodic current collector was made from metallurgically pure molybdenum. The sodium reservoir was an inverted cup located beneath the beta"-alumina tube. The sodium was pre-cast into the cup with a small amount of sodium azide before assembly. The purpose of the sodium azide was to pressurize the sodium reservoir and force the sodium out the bottom and up into the annulus between the beta"-alumina tube and the stainless steel container (at a temperature of about 280° C., sodium azide decomposes into elemental sodium and nitrogen). A flow restrictor was located between the sodium reservoir and the end of the beta"-alumina tube to limit the availability of sodium to the tube in the event of fracture of the electrolyte.

The dimensions of the beta"-alumina tubes were 24 mm OD×210 mm long with a 1.7 mm wall thickness. The beta"-alumina electrolyte was sealed to an alpha-alumina insulating seal header with a proprietary sealing glass. Sealing of the electrolyte/header assembly to the cell container was accomplished by compressing a thin nickel gasket between the alpha-alumina header and the stainless steel knife edges of the cell flanges.

Some minor problems were encountered with pre-casting the cathode, and in the interest of saving some time, it was decided to assemble the cells with the graphite felt in place and fill the ullage of the cell with ground sulfur and selenium. During heat-up, the chalcogenides melt and soak into the felt. Because the ullage was not quite large enough to accommodate all of the sulfur and selenium prepared, the cells ended up having a theoretical capacity of 21 Ahr rather than the intended 25 Ahr capacity.

After assembly, the cells were vacuum leak tested, the cathodic current collector was welded into place (thereby sealing the top of the cell), and the lower portion of the cell was evacuated and sealed by means of a stainless steel bellows seal valve.

Cell Testing

The cells were then placed in individual furnaces, the electrical connections were made, and the cells were heated at a rate of about 50° C. per hour to 385° C. and 401° C., respectively. The initial open circuit voltage on both cells was 2.02 volts; however, as time passed, the open circuit voltage of cell #1 began to drop, eventually stabilizing at 2.01 volts.

Both cells were allowed to remain at this temperature overnight. The next day, the cells (connected electrically in series) were discharged using small power resistors. The first value was 75 ohms, followed successively by 40 ohms, 20 ohms, 10 ohms, and finally 5 ohms. The voltages of both cells and the current through the resistor were monitored. Table II is a record of the first discharge.

TABLE II

| Record of First Discharge | | | |
| --- | --- | --- | --- |
| Resistor | Current | Time | Amp-Hours |
| 75 ohms | 53.50 mA | 2.042 Hrs | 0.1095 |
| 40 ohms | 100.25 mA | 2.033 Hrs | 0.2038 |
| 20 ohms | 199.00 mA | 0.746 Hrs | 0.1486 |
| 10 ohms | 392.50 mA | 17.470 Hrs | 6.8560 |
| 5 ohms | 760.00 mA | 4.140 Hrs | 3.1460 |

The discharge was terminated after 10.464 Ahr had passed. The cells were left in the furnace over a holiday weekend for 5 days. After the weekend, it was found that cell #1 had cracked (since the open-circuit voltage had dropped to about 0.2 volts). Testing on this cell was subsequently discontinued.

A small power supply was connected in series with the remaining cell and this cell was recharged at an initial current of 1.5A. The charge voltage was set at 2.5 volts. After eight hours, the current has trickled off to 5 mA and the charge cycle was stopped.

A charge/discharge system was connected in series to the cell so that the cell could be tested automatically, 24 hours a day. The current was initially set at 8.3 amps for both charge and discharge. The voltage limits were set at 1.75 volts for discharge and 2.25 volts for charge. One complete cycle was completed at this current. The capacity of the cell was found to be only about 1.6 amp-hours. The current was then reduced to 3.9 amps. The voltage limits were not changed. With subsequent cycles, the capacity of the cell immediately started to rise. The cell was allowed to run at this current for the rest of the test, while the voltage, temperature, and current were monitored. After the cell had completed 33 cycles, the discharge voltage limit was reduced to 1.5 volts. At cycle 39, the cell was trickle charged to a voltage limit of 2.45 volts. At cycle 43, the cell temperature was raised to 425° C. The cell failed after 55 cycles at this current. This was indicated by a substantial drop in the open-circuit voltage.

Figure 11:
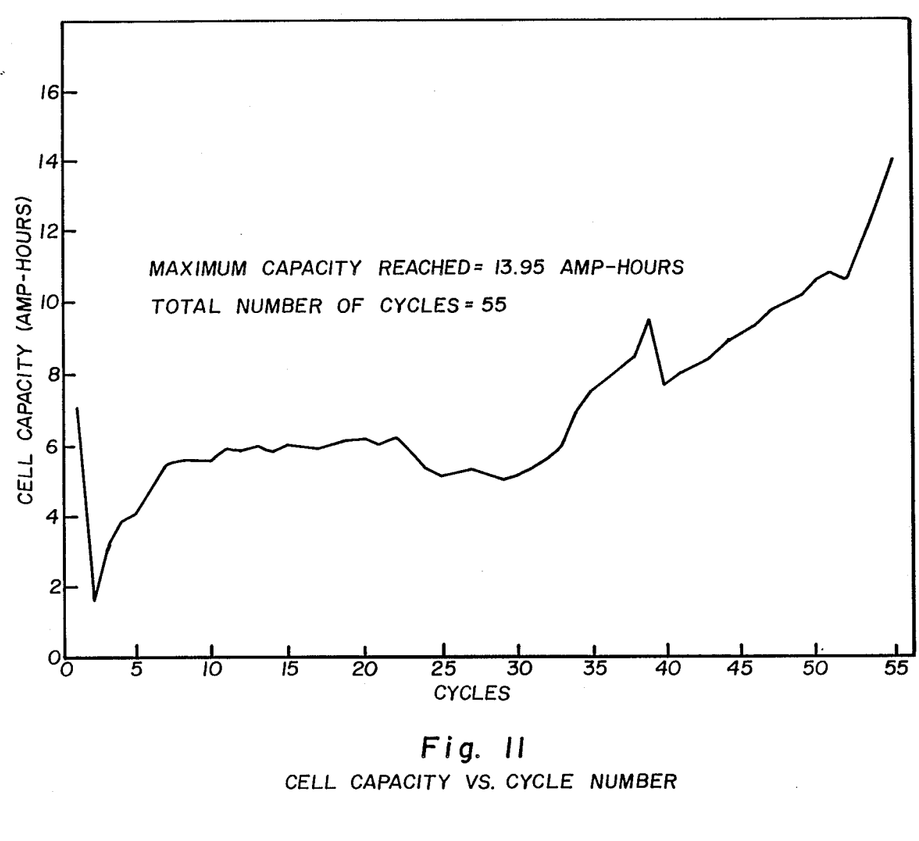
FIG. 11 is a graph showing cell capacity vs. cycle number.
Figure 12:
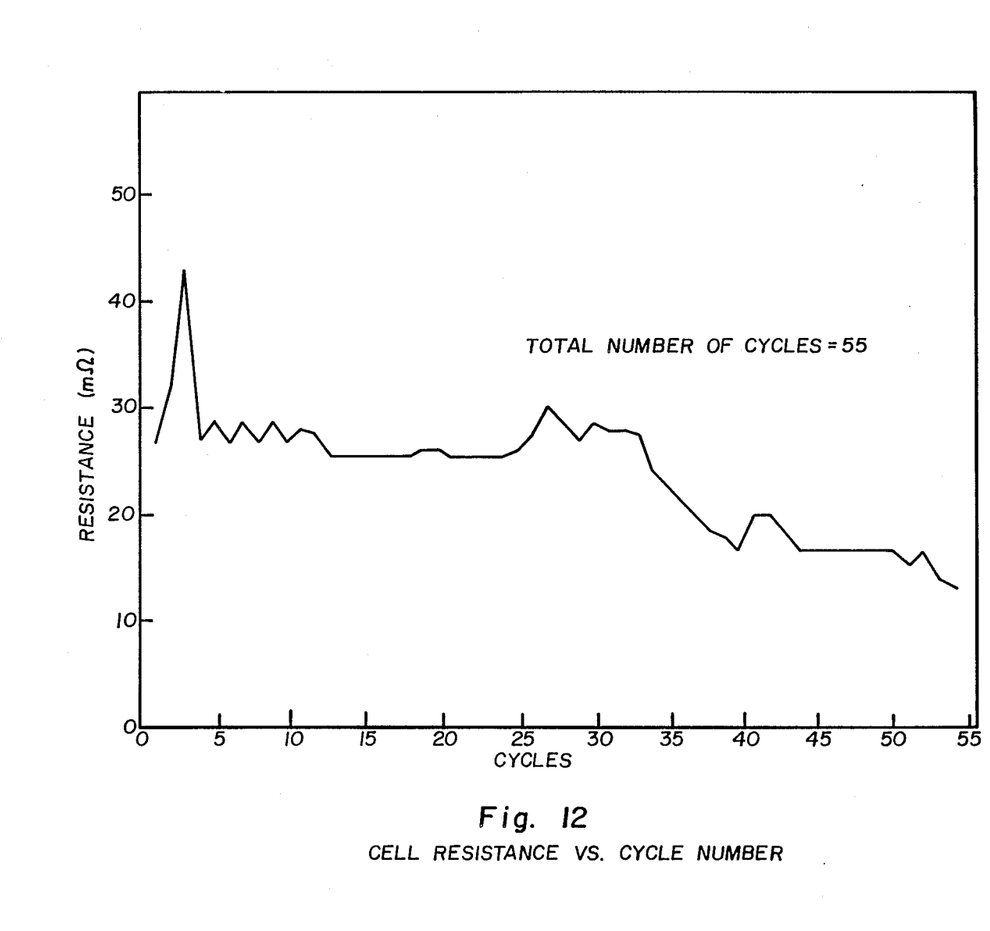
FIG. 12 is a graph showing cell resistance vs. cycle number.

The cell capacity is plotted as a function of cycle number in FIG. 11. Throughout most of the test, the capacity of the cell increased with successive cycles. The internal resistance of the cell as a function of cycle number, shown in FIG. 12, decreased throughout most of the cell test.

The expected, usable capacity of the cell was 18 Ahr after a 15% derating to account for the amount of charge which is unrecoverable after the first discharge. Thus, near the end of the test, the charge utilization was 77.7% of expected capacity. The expected internal resistance of the cell could not be calculated due to the lack of available conductivity data of the sodium polyselenide/sulfide mixtures. The data do appear to be in line with that which one would expect for a similarly sized sodium/sulfur cell.

The cell failed at the beginning of recharge on the 55th cycle. The failure of the electrolyte was attributed to the occurrence of some electrical disturbances in the power lines which resulted in some high current spikes through the cell.

Post-Test Evaluation

After the first cell failed, it was dismantled and examined. Two items were apparent during this examination.

First, only the lower end (a few millimeters) of the beta"-alumina tube was covered by sodium. This may have been due to leakage of air into the cell before or during heat-up which resulted in an air lock in the cell which would have prevented sodium from being driven all the way up the sides of the cell. Further, such a leak would have caused some oxidation of the sodium which may have plugged the hole in the sodium flow restrictor and prevented additional sodium from entering the annulus.

Second, the beta"-alumina tube was fractured and somewhat fragmented just below the alpha-alumina seal header. Since the graphite felt did not extend up into this region, it is not likely that electromechanical degradation was the main cause of failure of the electrolyte. In addition, the remainder of the electrolyte was intact with no evidence of degradation. It appears that the fracture of the tube was due mainly to stresses placed on the tube during cell assembly and heat-up.

After the seond cell failed, it was removed from test and dismantled. The beta"-alumina electrolyte appeared to have failed at the closed end, the crack having filled with sodium following a lamination in the ceramic perpendicular to the tube axis. The remainder of the electrolyte appeared to be free of any evidence of degradation. The remainder of the cell components were in good condition with no evidence of corrosion of the molybdenum current collector. Sodium was found in the annulus between the beta"-alumina tube and the container as expected.

We claim:
1. An electrochemical cell comprising:
   an anolyte containing substantially a molten alkali metal;
   a solid beta"-alumina electrolyte possessing mobile alkali metal ions of the same alkali metal as is present in the anolyte; and
   a catholyte comprising a mixture of molten selenium and molten sulfur in a molar ration of about 3:1 to about 30:1 selenium to sulfur, wherein at least a portion of said selenium and sulfur is present in elemental form.

2. The electrochemical cell of claim 1 wherein at least a portion of the sulfur and selenium is present in combined form as selenides and sulfides of an alkali metal of the same type present in said anolyte.

3. The electrochemical cell of claim 1 wherein the temperature of the catholyte mixture is at least about 525° C. during discharge of said cell.

4. The electrochemical cell of claim 1 wherein said selenium to sulfur ratio is at least about 4:1.

5. The electrochemical cell of claim 4 wherein the selenium to sulfur ratio is less than about 20:1.

6. The electrochemical cell of claim 4 wherein the selenium to sulfur ratio is less than about 10:1.

7. An electrochemical cell comprising:
- an anolyte containing substantially a molten alkali metal;
- a solid beta"-alumina electrolyte possessing mobile alkali metal ions of the same alkali metal as is present in the anolyte; and
- a catholyte consisting essential of a mixture of about 80% molten selenium and about 20% molten sulfur wherein at least a portion of said selenium and sulfur is present in elemental form.

* * * * *

UNITED STATES PATENT OFFICE
CERTIFICATE OF CORRECTION

Patent No. 4,895,776      Dated  JANUARY 23, 1990

Inventor(s) A.V. Virkar; J.R. Rasmussen

It is certified that error appears in the above-identified patent and that said Letters Patent is hereby corrected as shown below:

In column 1, line 28, change "4,105,054" to --4,015,054--.
In column 2, line 3, change " $An_2S_2$" to --$Na_2S_2$--.
In column 2, line 12, delete "s" on --hours--.
In column 3, line 21, after "4" insert therefore --is--.
In column 3, line 24, change "4" to --6--.
In column 3, line 27, change "6" to --7--.
In column 3, line 31, change "8" to --9--.
In column 4, line 15, after "specialization" delete --,--.
In column 6, line 8, change "Electrokhimiya" to --Electrokhimiya--.

Signed and Sealed this

Eighteenth Day of August, 1992

Attest:

DOUGLAS B. COMER

Attesting Officer        Acting Commissioner of Patents and Trademarks